(12) United States Patent
Rioux et al.

(10) Patent No.: US 12,163,884 B2
(45) Date of Patent: Dec. 10, 2024

(54) INFRARED IMAGING SYSTEM AND RELATED METHOD

(71) Applicant: PHOTON ETC. INC., Montreal (CA)

(72) Inventors: David Rioux, Montreal (CA); Daniel Oyama, Montreal (CA)

(73) Assignee: PHOTON ETC. INC., Montreal (CA)

( * ) Notice: Subject to any disclaimer, the term of this patent is extended or adjusted under 35 U.S.C. 154(b) by 356 days.

(21) Appl. No.: 17/756,283

(22) PCT Filed: Nov. 20, 2020

(86) PCT No.: PCT/CA2020/051584
§ 371 (c)(1),
(2) Date: May 20, 2022

(87) PCT Pub. No.: WO2021/097577
PCT Pub. Date: May 27, 2021

(65) Prior Publication Data
US 2022/0412888 A1   Dec. 29, 2022

Related U.S. Application Data

(60) Provisional application No. 62/938,589, filed on Nov. 21, 2019.

(30) Foreign Application Priority Data

Nov. 21, 2019 (CA) ................ CA 3062471

(51) Int. Cl.
*G01N 21/64* (2006.01)

(52) U.S. Cl.
CPC ..... *G01N 21/6428* (2013.01); *G01N 21/6456* (2013.01); *G01N 2021/6421* (2013.01); *G01N 2021/6439* (2013.01)

(58) Field of Classification Search
CPC .......... G01N 21/6428; G01N 21/6456; G01N 2021/6421; G01N 2021/6439; G01N 2021/6419; G01N 2021/6471
See application file for complete search history.

(56) References Cited

U.S. PATENT DOCUMENTS

2003/0096302 A1   5/2003   Yguerabide et al.
2004/0081621 A1   4/2004   Arndt et al.
(Continued)

FOREIGN PATENT DOCUMENTS

JP   2003232736 A   8/2003
JP   2005518540 A   6/2005
(Continued)

OTHER PUBLICATIONS

International Search Report issued from the Patent Cooperation Treaty to International Application No. PCT/CA2020/051584 on Feb. 9, 2021, 4 pages.
(Continued)

*Primary Examiner* — Christine S. Kim
(74) *Attorney, Agent, or Firm* — Hunton Andrews Kurth LLP

(57) ABSTRACT

There are provided infrared imaging systems and methods for imaging a sample with fluorescent markers. The system includes a light source configured to illuminate a sample-contacting surface. The light source includes first and second illumination modules, each configured to project a corresponding first and second infrared illumination beam towards a sample holder, the infrared illumination beams interacting at an imaging plane to define an illumination area having a rectangular and homogeneous power profile. The system also includes a control unit operatively connected to a motor assembly and to an optomechanical mechanism. The control unit is configured to superimpose the sample plane and the imaging plane at any of the multiple locations within
(Continued)

the enclosure. The system includes a detector configured to receive light emitted by the fluorescent markers of the sample upon illumination of the same in the imaging plane when the sample plane is superimposed with the imaging plane.

20 Claims, 5 Drawing Sheets

(56) References Cited

U.S. PATENT DOCUMENTS

| | | |
|---|---|---|
| 2005/0145786 A1 | 7/2005 | Rice et al. |
| 2005/0148846 A1 | 7/2005 | Cable et al. |
| 2005/0237423 A1 | 10/2005 | Nilson et al. |
| 2005/0260741 A1 | 11/2005 | Albertson et al. |
| 2006/0203244 A1* | 9/2006 | Nilson ............... G01N 21/6456 356/417 |
| 2008/0055593 A1 | 3/2008 | Fox |
| 2009/0324048 A1 | 12/2009 | Leevy et al. |
| 2011/0273702 A1 | 11/2011 | Jones et al. |
| 2012/0046203 A1 | 2/2012 | Walsh et al. |
| 2015/0029326 A1 | 1/2015 | Backman et al. |
| 2017/0142314 A1* | 5/2017 | Moore ................... H04N 23/71 |
| 2018/0180550 A1* | 6/2018 | Franjic ................. G01N 21/474 |
| 2018/0231415 A1* | 8/2018 | Marquardt ............. G01N 21/65 |

FOREIGN PATENT DOCUMENTS

| | | |
|---|---|---|
| JP | 2008261784 A | 10/2008 |
| JP | 2008262031 A | 10/2008 |
| JP | 2009236846 A | 10/2009 |
| JP | 2013500101 A | 1/2013 |
| JP | 2018515753 A | 6/2018 |
| JP | 2019506698 A | 3/2019 |
| JP | 2020507784 A | 3/2020 |

OTHER PUBLICATIONS

Extended European Search Report (EESR) issued in the corresponding application, European Patent Application 20890298.1, on Nov. 24, 2023 (14 pages).

Office Action issued on Oct. 9, 2024 in corresponding application No. JP 2022-529562, along with an English translation (7 pages).

* cited by examiner

INFRARED IMAGING SYSTEM AND RELATED METHOD

TECHNICAL FIELD

The technical field generally relates to imaging systems and related methods and more particularly concerns an infrared imaging system and related method.

BACKGROUND

Many preclinical imaging systems are available on the market. Nonlimitative examples includes the IVIS® Spectrum in vivo imaging system from Perkin Elmer, the Lago from Spectral Instruments Imaging, the Pearl Trilogy® from Li-Cor, the iBox® from UVP and the Newton from Vilber. These commercially available solutions typically rely on silicon-based detectors and, as a result, are intrinsically limited in terms of applications, as they can only image from the visible portion of the electromagnetic spectrum to the first near-infrared window (NIR-I) portion of the electromagnetic spectrum (i.e., about 400 nm to about 1000 nm).

Light absorption and scattering of living tissues is much weaker in the second near-infrared window (NIR-II i.e., about 1000 nm to about 1700 nm) portion of the electromagnetic spectrum, in comparison with the visible or NIR-I portions of the electromagnetic spectrum, meaning that small animals would be more transparent in the NIR-II imaging window.

There is thus a need for techniques, methods, systems and devices that addresses or at least mitigate at least some of the challenges presented above.

SUMMARY

In accordance with one aspect, there is provided an infrared imaging system for imaging a sample with fluorescent markers. The infrared imaging system includes an enclosure, a sample holder, a light source, a motor assembly, an optomechanical mechanism, a control unit and a detector. The sample holder is mounted in the enclosure. The sample holder has a sample-contacting surface and a sample plane. The light source is configured to illuminate the sample-contacting surface and includes a first illumination module and a second illumination module, each being configured to project a corresponding first and second infrared illumination beam towards the sample holder. The first and second infrared illumination beams interact at an imaging plane to define an illumination area having a rectangular and homogeneous power profile. The motor assembly is configured to move the sample holder at multiple locations within the enclosure. The optomechanical mechanism is configured to orient the first and second infrared illumination beams to move the illumination area within the enclosure. The control unit operatively is connected to the motor assembly and to the optomechanical mechanism, the control unit and is configured to superimpose the sample plane and the imaging plane at any of the multiple locations within the enclosure. The detector is configured to receive light emitted by the fluorescent markers of the sample upon illumination of the same in the imaging plane when the sample plane is superimposed with the imaging plane.

In some embodiments, the enclosure defines an internal volume, the enclosure further including a door or a drawer for accessing a content of the internal volume.

In some embodiments, the sample plane is vertically offset from the sample-contacting surface.

In some embodiments, the sample plane is vertically offset from the sample-contacting surface by a value corresponding to a thickness of the sample or a fraction thereof.

In some embodiments, the sample plane coincides with the sample-contacting surface.

In some embodiments, the sample-contacting surface is made from a black powder coated steel sheet.

In some embodiments, the infrared imaging system further includes one or more anesthesia ports, said one or more anesthesia ports being configured for the injection of an anesthesia gas in the enclosure and for the collection of the anesthesia gas from the enclosure.

In some embodiments, the infrared imaging system further includes a heating element in thermal contact with the sample holder.

In some embodiments, the infrared imaging system further includes a barrier mounted to the sample holder, the barrier projecting upwardly from the sample plane.

In some embodiments, each one of the first illumination module and the second illumination module includes one or more laser diodes.

In some embodiments, the first and second infrared illumination beams have a wavelength of about 750 nm, about 808 nm or about 980 nm.

In some embodiments, the illumination area has an illumination power density included in a range extending from about 1 mW/mm$^2$ to about 3 mW/mm$^2$.

In some embodiments, each one of the first and second illumination module includes a Köhler integrator.

In some embodiments, the first and second illumination modules are symmetrically disposed on both sides of the detector.

In some embodiments, the first and second illumination modules are calibrated based on calibration data, the calibration data mapping a plurality of orientations of the first and second illumination modules with a corresponding plurality of illumination power densities of the first and second infrared illumination beams and with a corresponding plurality of positions of the sample holder within the enclosure.

In some embodiments, the detector includes a InGaAs camera.

In some embodiments, the detector includes:
a sensor;
a first optical circuit configured to collect and collimate the light emitted by the fluorescent markers; and
a second optical circuit configured to form an image of the sample on the sensor.

In some embodiments, the infrared imaging system further includes a motorized focus mechanism connected to the detector, the motorized focus mechanism being configured to vary a distance between the first optical circuit and the second optical circuit.

In some embodiments, the infrared imaging system further includes a filter wheel positioned between the first optical circuit and the second optical circuit, the filter wheel including a plurality of filters.

In accordance with another aspect, there is provided method for imaging a sample with fluorescent markers. The method includes providing the sample on a sample holder, the sample holder having a sample-contacting surface and a sample plane; generating first and second infrared illumination beam towards the sample with first and second illumination modules, the first and second infrared illumination beams interacting at an imaging plane to define an illumination area having a rectangular and homogeneous power profile; moving the sample holder at multiple locations within the enclosure; orienting the first and second infrared illumination beams to move the illumination area within the enclosure; superimposing the sample plane and the imaging plane at any of the multiple locations within the enclosure; and collecting light emitted by the fluorescent markers of the sample upon illumination of the same by the illumination beam light in the imaging plane when the sample plane is superimposed with the imaging plane.

In some embodiments, the method further includes vertically offsetting the sample plane from the sample-contacting surface.

In some embodiments, the sample plane is vertically offset from the sample-contacting surface by a value corresponding to a thickness of the sample or a fraction thereof.

In some embodiments, the sample plane coincides with the sample-contacting surface.

In some embodiments, the method further includes heating the sample holder.

In some embodiments, the first and second infrared illumination beams have a wavelength of about 750 nm, about 808 nm or about 980 nm.

In some embodiments, the method further includes conditioning each one of the first and second infrared illumination beams with a Köhler integrator.

In some embodiments, the method further includes calibrating the first and second illumination modules based on calibration data, the calibration data mapping a plurality of orientations of the first and second illumination modules with a corresponding plurality of illumination power densities of the first and second infrared beams and with a corresponding plurality of positions of the sample holder within the enclosure.

In some embodiments, the method further includes:
collecting and collimating the light emitted by the fluorescent markers with a first optical circuit; and
forming an image of the sample on a sensor with a second optical circuit.

Other features and advantages of the method and system described herein will be better understood upon a reading of preferred embodiments thereof with reference to the appended drawings. Although specific features described in the above summary and in the detailed description below may be described with respect to specific embodiments or aspects, it should be noted that these specific features can be combined with one another unless stated otherwise.

DETAILED DESCRIPTION

Figure 1:
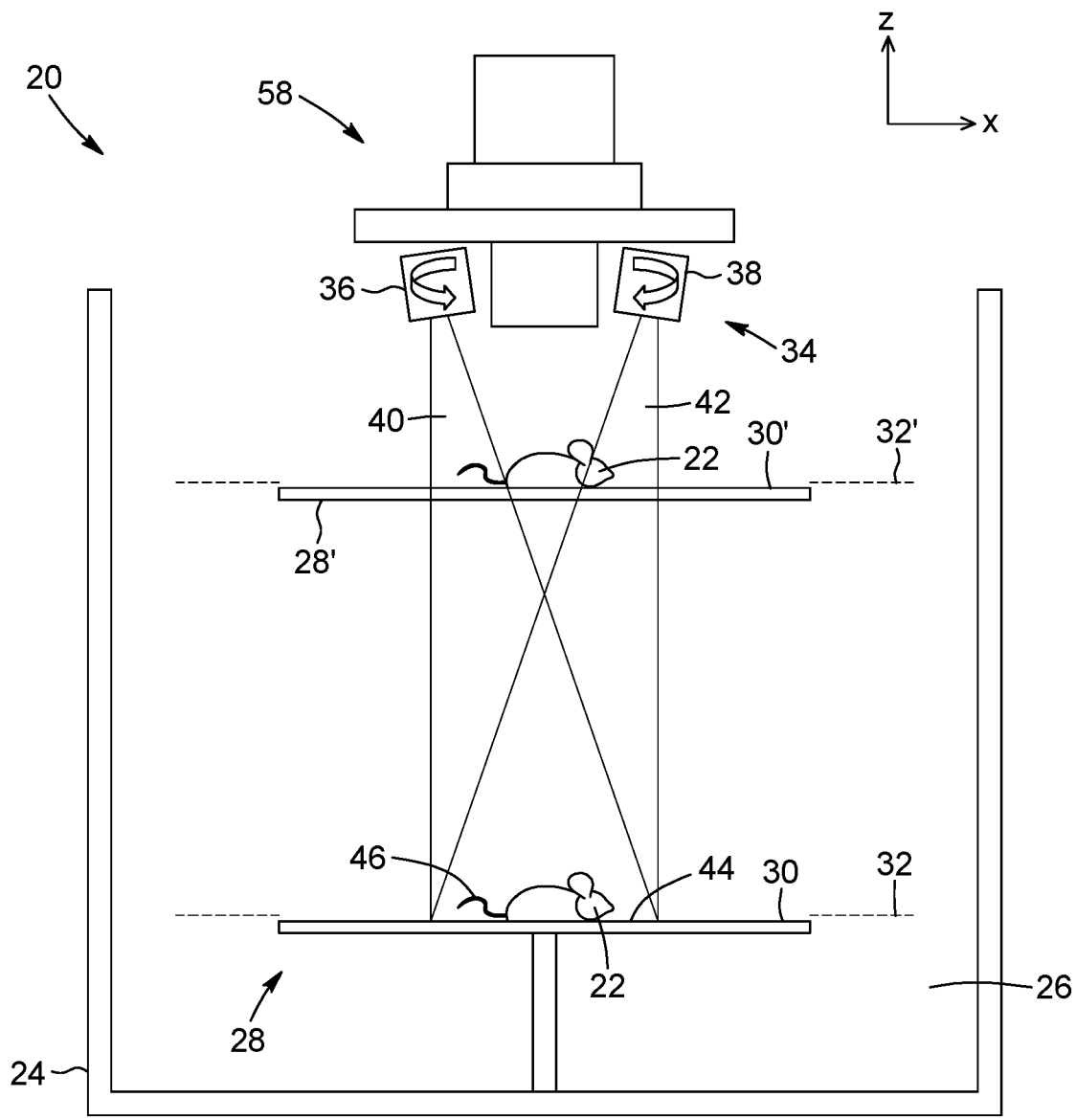
FIG. 1 illustrates an embodiment of an infrared imaging system for imaging a sample with fluorescent markers.

In the present description, similar features in the drawings have been given similar reference numerals. To avoid cluttering certain figures, some elements may not have been indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

Unless stated otherwise, the terms "connected" and "coupled", and derivatives and variants thereof, refer herein to any structural or functional connection or coupling, either direct or indirect, between two or more elements. For example, the connection or coupling between the elements may be mechanical, optical, electrical, thermal, logical, or any combination thereof.

The terms "a", "an" and "one" are defined herein to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of ±10 percent of the stated value. It is noted that all numeric values used herein are assumed to be modified by the term "about", unless stated otherwise.

Likewise, the terms "superimposition", "superimpose", "superimposed" and "superimposing" are intended to refer herein to a condition in which two elements are either the same position or within some predetermined tolerance of each other in terms of spatial alignment. That is, these terms are meant to encompass not only "exactly" or "identically" superimposing the two elements but also "substantially", "approximately" or "subjectively" superimposing the two elements, as well as providing a higher or best superimposition among a plurality of superimposition possibilities.

In the present description, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

In the present description, the terms "light" and "optical", and variants and derivatives thereof, are used to refer to radiation in any appropriate region of the electromagnetic spectrum. The terms "light" and "optical" are therefore not limited to visible light, but can also include, without being limited to, the infrared and ultraviolet regions. For example, in some implementations, the present techniques can be used with electromagnetic signals having wavelengths ranging from about 400 nm to about 1700 nm, for example between 1000 nm and 1700 nm. However, this range is provided for illustrative purposes only and some implementations of the present techniques may operate outside this range. Also, the skilled person will appreciate that the definition of the ultraviolet, visible infrared and near-infrared ranges in terms of spectral ranges, as well as the dividing lines between them, can vary depending on the technical field or the definitions under consideration, and are not meant to limit the scope of applications of the present techniques.

In the present description, the expressions "illumination beam spectrum", synonyms or derivatives thereof are used to broadly refer to the spectral power distribution of an illumination beam. The illumination spectrum can represent the distribution of power radiated per unit area and per unit wavelength or frequency over a spectral region of the electromagnetic spectrum.

The present description generally relates to infrared imaging system(s), associated method(s) and technique(s) for preclinical imaging purposes. In the context of the current description, the infrared imaging system can sometimes be referred to as an "IR VIVO instrument". It is to be noted that the expression "preclinical imaging" is herein understood as techniques that allow the visualization and inspection of living animals (e.g., small animals, such as mice, rats and the like). Preclinical imaging techniques can be particularly useful for research purposes (e.g., drug development).

The infrared imaging system that will be described in greater detail below is a fluorescence-based imaging instrument. Such an instrument generally includes a light source that uses an excitation light to excite fluorescent probes inside the sample, which can be, in the context of preclinical imaging systems, small animals. The instrument also includes a detector that is configured to detect the fluorescence signal generated by these probes. Other optical component can be provided between the sample and the detector, such as, for example and without being limitative, imaging lens(es), spectral filter(s), a dichroic element (e.g., for separating the output signal into two spectral bands, which may be detected by two different cameras), and other optical components.

Now turning to the Figures, different embodiments of the infrared imaging system and method will be presented.

With reference to FIG. 1, there is shown an infrared imaging system 20 for imaging a sample 22. Of note, the sample 22 may include one or more animals. As such, the expression "sample" is not limited to refer to only one animal and is not intended to be limitative. Fluorescent markers (not illustrated) are provided in the sample 22. For example, and without being limitative, the fluorescent markers can be injected inside the small animal being imaged. It is to be noted that the expressions "fluorescent marker(s)" and "fluorescent probe(s)" will be used interchangeably throughout the description. Nonlimitative examples of fluorescent markers are quantum dots (e.g., PbS, $Ag_2S$), organic molecules like indocyanine green (ICG) and IR800 dye molecules, single wall carbon nanotubes, rare earth nanoparticles and the like.

Enclosure and Sample Holder

The infrared imaging system 20 includes an enclosure 24 (sometimes referred to as a "chamber"). The enclosure 24 includes walls defining an internal volume 26 in which can be mounted at least some of the other components of the infrared imaging system 20. The enclosure 24 generally includes a door or a drawer (not shown in FIG. 1) for accessing the internal volume 26 (i.e., the content thereof) when required, for example, and without being limitative for setting up a preclinical test or preparing the sample 22. In some embodiments, the whole enclosure 24 can be light-tight. In some embodiments, the door or the drawer are light tight. It is to be noted that the enclosure 24 may be equipped with components such as, for example and without being limitative, anesthetic gas manifold(s), gas pipe(s) and thermal plate(s), as it will be described in greater detail below.

The infrared imaging system 20 also includes a sample holder 28. The sample holder 28 is positioned in the enclosure 24 and has a sample-contacting surface 30. The sample-contacting surface 30 has a sample plane 32. It is to be noted that, in some implementations, the sample plane 32 may be vertically offset from the sample-contacting surface 30 by a value corresponding to the thickness (or a height) of the animals being imaged, or a fraction of the thickness (or the height) of the animals being imaged. Alternatively, the sample plane 32 may coincide or substantially coincide with the sample-contacting surface 30. The sample 22 can be placed onto the sample-contacting surface 30 in a such a way that the sample plane 32 intersects with the sample 22 or at least a portion thereof. As it will be described in greater detail below, the sample holder 28 can be adjusted in translation along three dimensions, e.g., an x-axis, a y-axis and a z-axis. As such, the position of the sample plane 32 can change or be adjusted.

In some embodiments, the sample-contacting surface 30 is made from a black powder coated steel sheet. In other embodiments, the sample-contacting surface 30 can be made from aluminum. Alternatively, the sample-contacting surface 30 could be made from any type of material having the appropriate characteristics for preclinical tests or related medical applications as long as it has low reflection and fluorescence in the infrared and is relatively easy to clean with an ethanol solution or bleach (e.g., anodized aluminum, heated glass, and the like). It is to be noted that the material forming the sample-contacting surface 30 can be selected on various chemical (e.g., composition) and/or physical properties (e.g., optical and magnetic properties).

The infrared imaging system 20 generally includes components that are found in typical preclinical instruments. For example, the infrared imaging system 20 may generally include one or more anesthesia ports. In some embodiments, the infrared imaging system 20 includes three anesthesia ports, meaning that three samples 22 can be placed on the sample-contacting surface 30. It will be noted that the number of anesthesia ports may be different from three, and that the fact that the infrared imaging system 20 may include three anesthesia ports serves an illustrative purpose only and should therefore not be considered limitative. For example, the infrared imaging system 20 may include one, two, three, four, five or more anesthesia ports. Similarly, the number of animals forming the sample 22 may also be different from three. For example, and without being limitative, the sample 22 may include one, two, three, four, five or more animals. In some embodiments, the number of anesthesia port(s) may be identical to the number of animal(s) forming the sample 22. In other embodiments, the number of anesthesia port(s) may be proportional or at least related to the number of animal(s) forming the sample 22. For example, and without being limitative, the ratio between the number of anesthesia port(s) and the number of animal(s) forming the sample 22 may be 1:1, 1:2, 1:3, or any other ratios that allow the anesthesia port(s) to achieve their function. In this regard, it is to be noted that the anesthesia ports allow for the injection and collection of the anesthesia gas, for inputting/outputting the anesthesia gas in/out the enclosure 24. Anesthesia gas is generally useful to keep the sample 22 immobile during the imaging of the same.

The infrared imaging system 20 may also include a thermal plate or similar device(s). It is to be noted that the thermal plate can either maintain the whole internal volume 26 at a given temperature or only a portion thereof (e.g., the sample-contacting surface 30). The thermal plate is generally useful to maintain the sample 22 at a given temperature. Indeed, in the case of small animals or mammals in general, the average body temperature tends to decrease under anesthesia. The thermal plate can therefore mitigate this consequence. The infrared imaging system 20 can also include a barrier or a fence mounted to or onto the sample holder 28. This feature can be particularly useful in the rare occasions wherein the sample 22 (e.g. the small animal) wakes up while being under anesthesia, or when a failure occurs in the anesthesia process.

The dimensions and geometrical configuration of the sample holder 28 can vary. However, the dimensions of the sample holder 28 are preferably such that the sample holder 28 substantially fits in the field of view of the imaging system 20, as it will be described in greater detail below. In one example of implementation, the field of view has the following dimensions: about 15.6 cm×about 12.5 cm.

In some embodiments, the sample holder 28 can include a lower platform and an upper platform. The lower platform can span the entire floor (i.e., width and depth) of the enclosure 24. The upper platform can be smaller and can have the following dimensions: 300 mm×250 mm. The upper platform can be mounted onto the lower platform. In some embodiments, the upper platform can be mechanically connected to the lower platform by a two-dimensional translation stage. In the context of the current description, the two-dimensional stage is configured to translate the upper surface along an X-axis and a Y-axis, to move the sample 22 sideways, along these two axes and relative to the field of view of the camera.

Light Source

The infrared imaging system 20 includes a light source 34 configured to illuminate the sample-contacting surface 30. The light source 34 includes a first illumination module 36 and a second illumination module 38. The first and second illumination modules 36,38 are each configured to project a corresponding first and second infrared illumination beam 40,42 towards the sample holder 30. The first and second illumination modules 36,38 can each generate a relatively high-power infrared illumination beam. It has to be noted that the first and second illumination modules 36,38 may each include one or more laser diodes, each laser diode being associated with corresponding optical characteristics (e.g., intensity and/or spectral profile). The relatively high power is useful to generate a fluorescence signal that is strong enough to be detected (about 0.05 to about 3 mW/mm$^2$). It has to be noted that the fluorescent markers in the NIR-II portion of the electromagnetic spectrum typically have a relatively low efficiency relative to the fluorescent marker that can be used in the visible portion of the electromagnetic spectrum. It also has to be noted that detectors configured to operate in the NIR-II portion of the electromagnetic spectrum are generally less sensitive relative to detectors configured to operate in the visible portion of the electromagnetic spectrum. It has to be noted that the wavelength of the infrared illumination beams 40,42 emitted by the first and second illumination modules 36,38 can be selected or varied. The selection can be manual (e.g., by a user) or automatic (e.g., each module 36,38 could sequentially and/or automatically select an infrared illumination wavelength). This feature can be useful for exciting fluorescent markers of different nature. It will be noted that the illumination with different wavelengths is generally performed sequentially and not simultaneously. Nonlimitative examples of wavelengths that may be used are 750 nm, 808 nm, 860 nm and 980 nm.

The first and second infrared illumination beams 40,42 interact at an imaging plane 44 to define an illumination area 46. The imaging plane 44 extends along the X-axis and the Y-axis. The illumination area 46 has a rectangular and homogeneous power profile (sometimes referred to as an "illumination profile" or a "power density profile"), and also extends along the X-axis and the Y-axis. The power or illumination density in the illumination area is representative of a cumulative power of the first and second infrared illumination beams 40,42. In some embodiments, the power or illumination density is about 1 mW/mm$^2$, for a total power of about 20 W. These values are relatively close to, but lower than the limit of power or illumination density for living tissue (i.e., about 3 mW/mm$^2$).

One skilled in the art would note that the illumination in existing visible preclinical imagers is generally provided by halogen white lamps. These lamps are typically optically coupled with filters (e.g., a filter wheel) for excitation filtering. Existing visible preclinical images can also use LED sources and/or laser sources. In these cases, the illumination density is smaller from the illumination density that can be obtained using the first and second illumination modules 36, 38 included in the technology being herein described. Indeed, the illumination density achievable with the technology presented in the current disclosure is an order of magnitude greater than existing technologies relying on halogen and LED devices.

The light generated by each laser diode included in the first and second illumination modules 36,38 is optically structured by optical components included in the first and second illumination modules 36, 38. This allows the definition of the illumination area 46, having a substantially homogeneous rectangular shape, on the sample 22. It will be noted that the illumination area 46 generally has the same dimensions as the field of view of the infrared imaging system 20. One skilled in the art would understand that homogeneous illumination is important in order to ensure that every part of the sample 22 receives the same illumination density. For example, in the context wherein three mice are being imaged and placed in the field of view, they must all be illuminated with the same power density, so that the imaging results can be compared one with another. It is also advantageous to restrict the illumination area 46 to the field of view of the infrared imaging system 20, in order to avoid wasting laser power. Indeed, if too much laser power is lost, then more powerful lasers would be needed, which would add to the costs of the system, as well as adding to the complexity of the thermal management of the first and second illumination modules 36,38. Moreover, one would note that projecting a portion of the first and second infrared illumination beams 40, 42 would contribute to adding unwanted stray light in the infrared imaging system 20, which could be detected by the detector, and would then reduce the overall sensitivity of the infrared imaging system 20.

Figures 2, 2A:
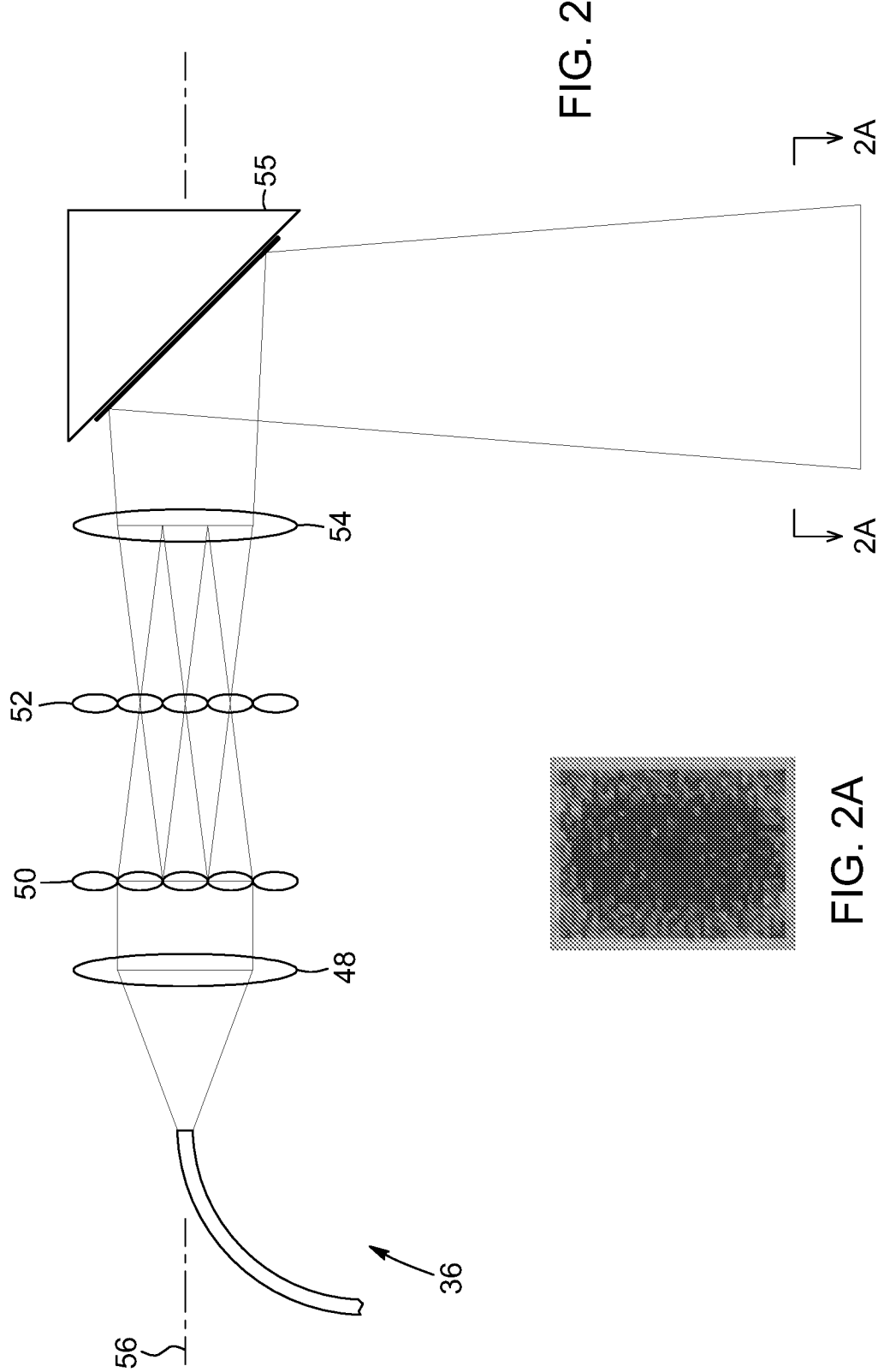
FIG. 2 shows an embodiment of an illumination module.
FIG. 2A is a sectional view of the fold mirror of FIG. 2.

Now turning to FIG. 2, the first and second illumination modules 36,38 structure the light emitted by the laser diodes using a Köhler integrator design. In FIG. 2, only the first illumination module 36 is illustrated, but it will be readily understood that the description also applies to the second illumination module 38. The Köhler integrator design is known in the art, and includes the use of a collimation lens 48, a first fly-eye lens 50, a second fly-eye lens 52, a projection lens 54 and a fold mirror 55. These elements define an optical path therebetween, the optical path extending along an optical axis 56. In some embodiments, the projection lens 54 may be substituted by an optical assembly (not illustrated in the Figures). The optical assembly may include a plurality of optical elements. Such optical elements include, but are not limited to lenses, mirrors, filters, and other suitable reflective, refractive and/or diffractive optical components.

In the illustrated embodiments, the first and second illumination modules 36,38 are positioned to project light (i.e., the first and second infrared illumination beam 40,42) from above the sample 22. Now referring back to FIG. 1, it can be seen that the first and second illumination modules 36,38 are located on both sides of the detector 58. In some embodiments, the first and second illumination modules 36, 38 are symmetrically disposed on both sides of the detector 58. It will however be understood that the first and second illumination modules 36,38 may be disposed at other positions with respect to the detector and/or may be asymmetrically positioned with respect thereto without departing from the scope of protection.

The first and second illumination modules 36,38, and so the first and second infrared illumination beams 40,42 are generally not parallel to the Z-axis, but rather form a slight angle relative to the Z-axis. When the sample 22 includes a plurality of animals (i.e., two or more animals), it has to be noted that in order to prevent the animals from casting a shadow on each other, the angle between the first and second illumination beams and the Z-axis is kept as small as possible.

As it will described in greater detail below, the first and second illumination modules 36,38 can be rotated, which allows the projection of the first and second infrared illumination beams 40, 42 at or near the center of the field of view of the infrared imaging system 20, for example when the sample holder 28 moves up and/or down. The rotation of the first and second illumination modules 36,38 allows keeping a homogeneous illumination in the illumination area 46.

Motor Assembly

Figure 5:
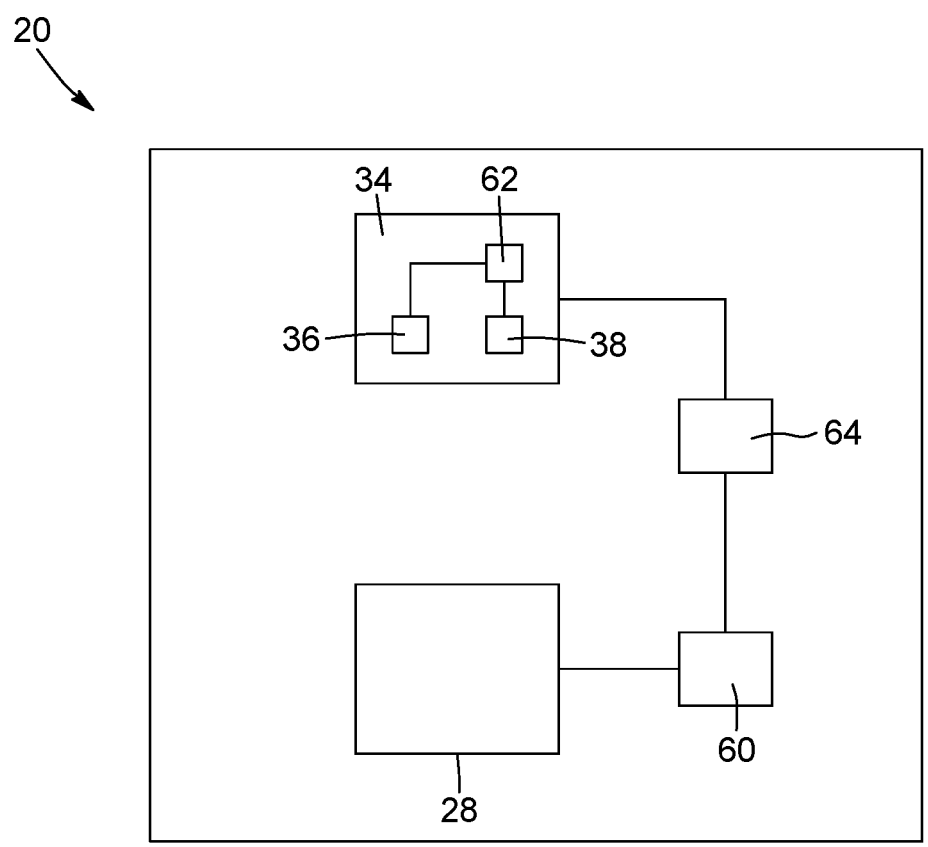
FIG. 5 is a block diagram illustrating the operational connection between some of the components included in the infrared imaging system.

A block diagram illustrating the operational connection between some of the components included in the infrared imaging system 20 is shown in FIG. 5. The infrared imaging system 20 includes a motor assembly 60 configured to move the sample holder at multiple locations within the enclosure 24. The motor assembly 60 can include one or more motors. The motor can be of any types or designs.

In some embodiments, the sample holder 28 can be moved or translated along two axes (e.g., X-axis and Y-axis) by the motor assembly 60. The motor assembly 60 can be configured to translate the sample holder 28 in the X-axis and the Y-axis sequentially or simultaneously. For example, the sample holder 28 could be sequentially translated in a direction parallel to the X-axis, and then in a direction parallel to the Y-axis, or vice-versa. Alternatively, the sample holder 28 could be configured to be simultaneously adjustable along the x-axis and the y-axis. It will be noted that the motor assembly 60 can monitor or record the displacement of the sample holder 28 along each axis. The monitored or recorded information are included in calibration data.

In some embodiments, the motor assembly 60 may include two motors, each one of the motors being configured to move the sample holder 28 along a respective direction (e.g., X-axis or Y-axis).

The sample holder 28 can also be moved or translated in the Z-axis. The displacement of the sample holder 28 is generally performed once the sample holder 28 has been aligned or positioned in the X-axis and the Y-axis in the enclosure 24. Movement of the sample holder 28 along this direction can be provided by one or more motors.

It will be appreciated that moving the sample holder 28 with the motor assembly 60 allows passing from a "wide view mode" towards a "close view mode". Switching between those two view modes may be useful when the sample 22 includes a plurality of animals. For example, and without being limitative, the motor assembly 60 may allow passing from a first field of view encompassing all of the animals of the sample 22 to a second field of view encompassing only one animal forming the sample 22, or a portion thereof. In some embodiments, the field of view may be adjusted to simultaneously image a portion of each of the animals forming the sample 22, which may be useful in the context of a comparative characterization of a specific portion of the animals.

In some embodiments, the motor assembly 60 is manual. In these embodiments, the translation of the sample holder 28 includes two steps. In a first step, a spring-loaded normally-on brake, which prevents the upper platform from sliding, is released. It can be released momentarily by depressing a button, or semi-permanently by depressing and locking the same button. Once the brake is released, the upper platform can be pushed relatively smoothly "side to side" (e.g., along the X-axis), as well as "forwards and backwards" (e.g., along the Y-axis). In other embodiments, the motor assembly 60 is automatic.

Optomechanical Mechanism

With reference to FIG. 5, the infrared imaging system 20 includes an optomechanical mechanism 62 configured to orient the first and second infrared illumination beams 40,42 to move the illumination area 46 within the enclosure 24. Orienting the first and second infrared illumination beams 40,42 generally includes changing a spatial configuration (by rotation, translation or a combination thereof) of the first and second illumination modules 36,38. More particularly, the adjustment of the orientation of the first and second infrared illumination beams 40,42 by the optomechanical mechanism 62, combined with the motor assembly 60, can be used to control the size of the illumination area 46.

In some embodiments, and now referring to FIG. 2, orienting the first and second illumination modules 36,38 includes rotating the same about the optical axis 56. The rotation of the illumination modules 36,38 from an initial position towards a subsequent position results in the first and second infrared illumination beams 40,42 interacting from a first imaging plane (associated with the initial position of the modules 36,38) to a subsequent imaging plane (associated with the subsequent position of the modules 36,38) to define a subsequent illumination area, also having a substantially rectangular and substantially homogeneous power profile, as it will be described in greater detail with reference to FIG. 4. It is to be noted that the first imaging plane and the subsequent plane are generally not at a same position along the Z-axis. For example, the subsequent imaging plane is generally higher or lower than the first imaging plane. As such, orienting the first and second illumination modules 36,38 results in a change in the position of the imaging plane 44 within the enclosure 24 (e.g., along the Z-axis). In other embodiments, only the fold mirror 55 could be rotated. It is to be noted that in addition to its orientation, the power of the first and second infrared illumination beams 40,42 can be also be altered (i.e., modified or changed). The alteration or adjustment of the orientation of the first and second infrared illumination beams 40,42 to move the illumination area 46 within the enclosure is generally referred to as "illumination modulation".

It has to be noted that the first and second illumination modules 36,38 are generally calibrated. The calibration data include, but are not limited to a mapping between a plurality of orientations of the first and second illumination modules 36,38 and corresponding optical properties of the first and second infrared illumination beams 40,42. As such, once the position of the sample holder 28 in the enclosure 24 is known, the orientation of the first and second illumination modules 36,38 to be achieved can be determined, either because this information is included in the calibration data or by calculations based on calibration data, e.g., interpolation, extrapolation and other techniques. The interpolation may be linear, polynomial (Lagrange, Newton and the like), a spline, or the like. In one example, the calibration step is useful to maintain a relatively constant power density comprised between about 1 mW/mm$^2$ and about 3 mW/mm$^2$ at any location in the enclosure 24, i.e., even if the distance between the sample holder 28 and the detector 58 changes. More specifically, a change in the orientation of the first and second infrared illumination beams 40,42 allows at least partially, approximately or substantially preserving the rectangular and homogeneous power profile at any locations within the enclosure 24. In some embodiments, the calibration data may further include information on illumination powers that need to be provided or generated in order to keep the power density constant or to a desired value. Of note, the power density generally increases as the sample holder 28 rises, i.e., when the distance between the sample holder 28 and the first and second illumination modules 36, 38. The rectangular and homogeneous illumination becomes smaller as the sample holder 28 raises. In some embodiments, the power density of the infrared illumination beams 40, 42 may be controlled in order to maintain the power density of the illumination area relatively constant. In some embodiments, the power density of the illumination modules 36, 38 may be constant, which would allow increasing the power illumination density of the illumination area, when the platform rises.

Control Unit

As illustrated in FIG. 5, the infrared imaging system 20 includes a control unit 64. The control unit 64 is operatively connected to the motor assembly 60 and to the optomechanical mechanism 62. The control unit 64 is configured to superimpose the sample plane 32 and the imaging plane 44 at any of the multiple locations within the enclosure 24. When the sample plane 32 and the imaging plane 44 are superimposed, the two planes are substantially at the same position along the Z-axis. It is to be noted that when the sample plane 32 is vertically offset from the sample-contacting surface 30, for example when it is required to accommodate for the thickness of the sample 22 (or a fraction thereof), the control unit 64 may be configured to position the sample plane 32 and the imaging plane 44 according to this vertical offset. In some embodiments, the value of the vertical offset may be automatically determined by the infrared imaging system 20. In other embodiments, the value of the vertical offset may be provided by a user and may be, for instance, manually provided. In yet other embodiments, the value of the vertical offset may be obtained from a database. Such a database may, for example and without being limitative, associate an average value of the thickness of the animal(s) forming the sample 22 with a corresponding position of the sample holder 28 within the enclosure 24.

For example, and without being limitative, the control unit 64 can be embodied by a programmable computer, comprising at least one processor, a data storage system (including volatile and non-volatile memory and/or storage elements), at least one input device, and at least one output device. The programmable computer can, in some embodiments, execute computer programs that allow controlling the motor assembly 60 and the optomechanical mechanism 62. The control unit 64 is configured to keep track, monitor or record the position of the sample holder 28 in the enclosure 24. More particularly, the control unit 64 receives as an input the position of the sample holder 28 in the enclosure 24, and, based on the calibration data, outputs a signal that is sent to the first and second illumination modules 36,38.

Figure 4:
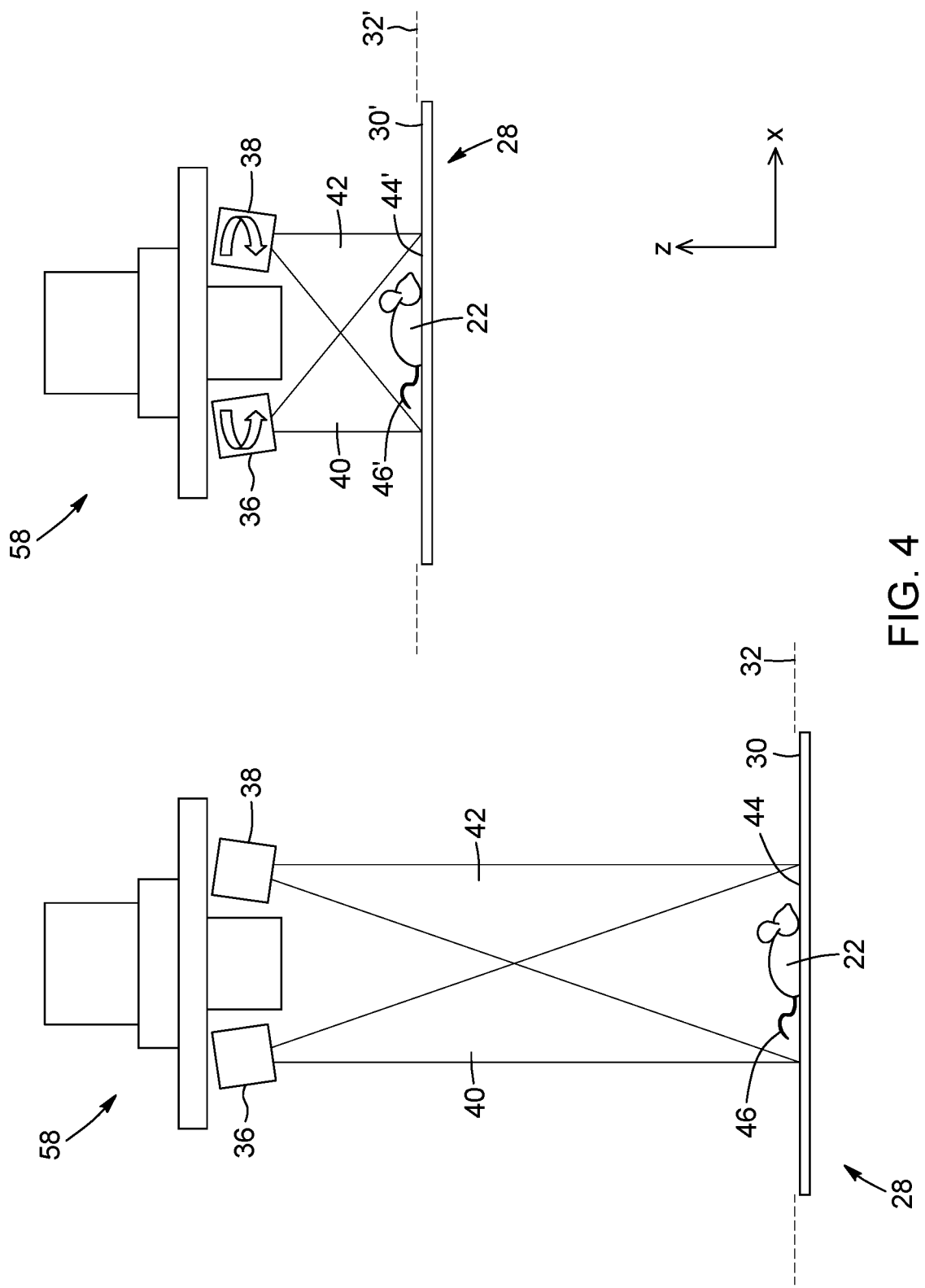
FIG. 4 illustrates an example in which the sample holder starts in an initial or first position (left portion of the image) and is then moved to a subsequent or second position (right portion of the image).

Now referring to FIG. 4, there is illustrated an example in which the sample holder 28 starts in an initial or first position (left portion of the image) and is then moved to a subsequent or second position (right portion of the image).

In the initial position, the sample holder 28 is positioned such that the distance between the detector 58 and the sample holder 28 is approximately 400 mm (in the Z-axis). As such, the sample plane 32 is distanced by approximately 400 mm from the detector 58. In the initial position, the first and second illumination modules 36,38 are oriented such that the illumination area 46 covers the sample 22. The imaging plane 44 and the sample plane 32 are superimposed.

In the subsequent position, the sample holder 28 is positioned such that the distance between the detector 58 and the sample holder 28 is approximately 200 mm (in the Z-axis), meaning that the sample holder 28 has been brought up closer to the detector 58. As such, the sample plane 32' is distanced by approximately 200 mm from the detector 58. In the subsequent position, the orientation of the first and second illumination modules 36,38 are changed with respect to the initial position. It will be noted that, in the subsequent position illustrated in the nonlimitative embodiments of FIG. 4, the first and second illumination modules 36,38 are oriented such that the illumination area 46' covers the sample 22. The imaging plane 44' and the sample plane 32' are superimposed.

It has to be noted that shape and dimensions of the illumination area 46 may change upon a change in the orientation of the first and second illumination modules 36,38 and/or a change in the position of the sample holder 28 in the enclosure 24.

Detector

Figure 3:
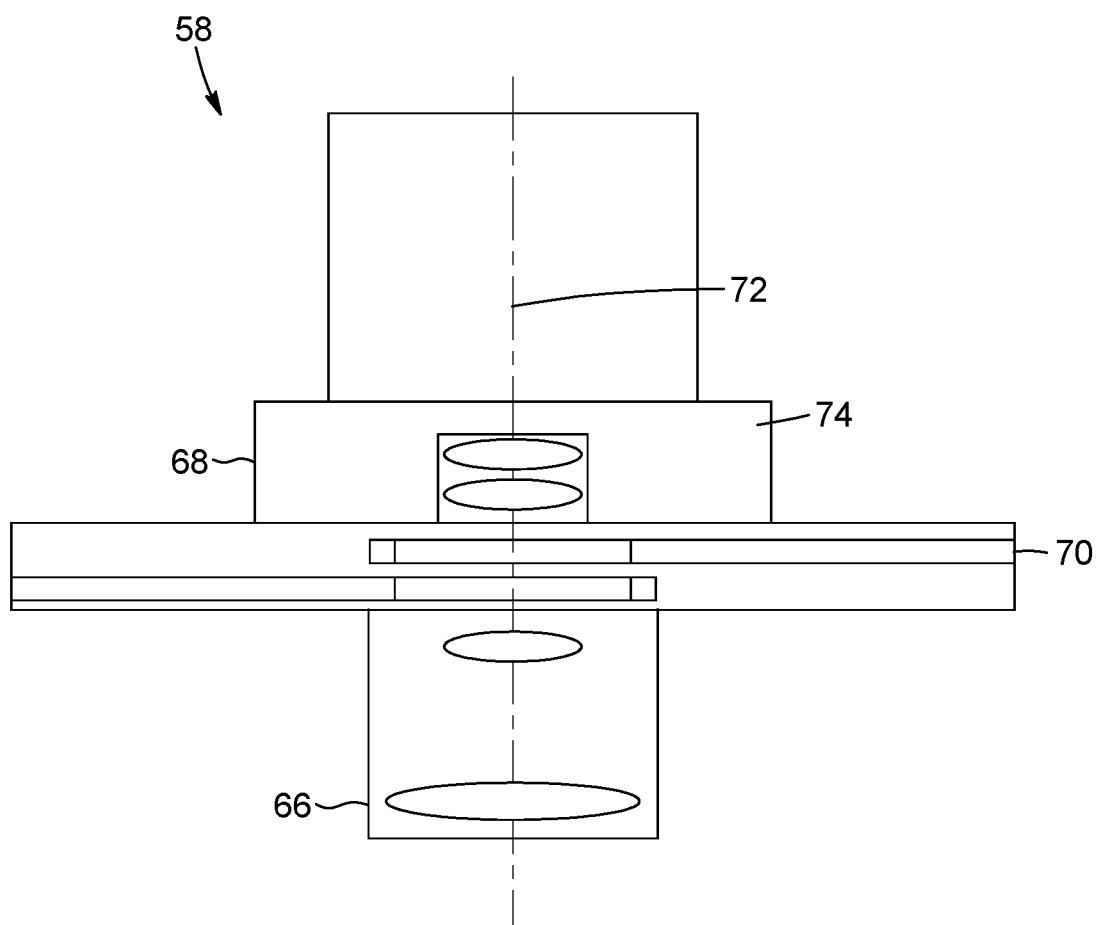
FIG. 3 is a representation of a detector, in accordance with one embodiment.

As mentioned above, the infrared imaging system 20 includes a detector 58, see for example FIGS. 1 and 3. The detector 58 is configured to receive light emitted by the fluorescent markers of the sample 22 upon illumination of the same by the first and second infrared illumination beams 40,42 light in the imaging plane 46 when the sample plane 32 is superimposed with the imaging plane 44. In the depicted embodiments, the detector 58 includes a InGaAs camera. Such a camera allows relatively precise localization of fluorescence originating from within the sample 22, yielding precious information for biologists.

As better illustrated in FIG. 3, the detector 58 includes two optical circuits 66,68, separated by a filter wheel 70. The detector 58 also includes a sensor 72. The first optical circuit 66 collects the light emanating from the sample 22 and approximately collimates it. The resulting light then passes through the double filter wheel 70. The filter wheel 70 generally includes a plurality of filters. In some embodiments, the filter wheel 70 includes a bandpass filter and edgepass filters. In some embodiments, the first optical circuit 66 may include one or more detection lenses, and/or any other optical elements. For example, in one embodiment, the optical circuit 66 may include two lenses. The second optical circuit 68 forms the image of the sample 22 on the sensor 72. In some embodiments, the second optical circuit 68 may include one or more lenses, and/or any other optical elements. In some embodiments, the detector 58 is provided with a motorized focus mechanism 74. The motorized focus mechanism 74 is positioned between the second optical circuit 68 and the sensor 72 and can vary the distance between both in order to adjust the focus.

The filters included in the filter wheel 70 are typically dielectric interference filters, for which the wavelength of transmission is angle dependent. In some embodiments, the optical design of the first optical circuit 66 is such that the light passes through the filter wheel 70 as close as possible to normal incidence (i.e., parallel to the Z-axis). The light coming from different field points on the sample 22 hits the filter at different angles. As such, optimizing the optical design of the first optical circuit 66 to allow the light to pass through the filter close to normal incidence ensures that the detected wavelengths will be close for every point in the field of view.

It is also to be noted that the positioning of the filter wheel 70 between the two optical circuits 66, 68 also prevents stray light from hitting the filters far from normal angle, which would result in unwanted light not being blocked by the filter and cause undesirable artefacts in the image formed on the sensor 72.

Changing the working distance (i.e., the distance between the sample 22 and the sensor 72) and adjusting the focus (e.g., the motorized focus) of the infrared imaging system 20, in combination with the operation of the motor assembly 60 and the optomechanical mechanism 62 can allow imaging an area (i.e., the illumination area 46) measuring about 156 mm by about 125 mm to an area (i.e., the illumination area 46) measuring about 50 mm by about 40 mm, meaning that the field of view of the detector 58 can be controlled. In the first configuration, up to three mice (or other similar samples 22) can be imaged. In the second configuration, about a third of the body of a single mouse (or similar sample 22) can be imaged in an area of 50 mm×40 mm (at a Z distance of 200 mm).

The combination of the illumination modulation, the X-Y translation and the FOV adjustment, allows the infrared imaging system to capture an image of the sample 22 anywhere in a 156 mm×125 mm×50 mm three-dimensional space with a spatial sampling of 80 µm per pixel when the field of view is about 50 mm by 40 mm.

Method

In accordance with embodiments, there is also provided a method for imaging a sample with fluorescent markers.

The method can include a step of providing the sample on a sample holder, the sample holder having a sample-contacting surface and a sample plane.

The method can include a step of generating first and second infrared illumination beam towards the sample with first and second illumination modules, the first and second infrared illumination beams interacting at an imaging plane to define an illumination area having a rectangular and homogeneous power profile.

The method can include a step of moving the sample holder at multiple locations within the enclosure.

The method can include a step of orienting the first and second infrared illumination beams to move the illumination area within the enclosure.

The method can include a step of superimposing the sample plane and the imaging plane at any of the multiple locations within the enclosure.

The method can include a step of collecting or receiving light emitted by the fluorescent markers of the sample upon illumination of the same by the illumination beam light in the imaging plane when the sample plane is superimposed with the imaging plane.

In some embodiments, the method further includes vertically offsetting the sample plane from the sample-contacting surface.

In some embodiments, the sample plane is vertically offset from the sample-contacting surface by a value corresponding to a thickness of the sample or a fraction thereof.

In some embodiments, the sample plane coincides with the sample-contacting surface.

In some embodiments, the method further includes heating the sample holder.

In some embodiments, the first and second infrared illumination beams have a wavelength of about 750 nm, about 808 nm or about 980 nm.

In some embodiments, the method further includes conditioning each one of the first and second infrared illumination beams with a Köhler integrator.

In some embodiments, the method further includes calibrating the first and second illumination modules based on calibration data, the calibration data mapping a plurality of orientations of the first and second illumination modules with a corresponding plurality of illumination power densities of the first and second infrared beams and with a corresponding plurality of positions of the sample holder within the enclosure.

In some embodiments, the method further includes collecting and collimating the light emitted by the fluorescent markers with a first optical circuit and forming an image of the sample on a sensor with a second optical circuit.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

The invention claimed is:

1. An infrared imaging system for imaging a sample with fluorescent markers, the infrared imaging system comprising:
   an enclosure;
   a sample holder mounted in the enclosure, the sample holder having a sample-contacting surface and a sample plane;
   a light source configured to illuminate the sample-contacting surface, the light source comprising a first illumination module and a second illumination module, each being configured to project a corresponding first and second infrared illumination beam towards the sample holder, the first and second infrared illumination beams interacting at an imaging plane to define an illumination area having a rectangular and homogeneous power profile;

a motor assembly configured to move the sample holder at multiple locations within the enclosure;

an optomechanical mechanism configured to orient the first and second infrared illumination beams to move the illumination area within the enclosure;

a control unit operatively connected to the motor assembly and to the optomechanical mechanism, the control unit being configured to superimpose the sample plane and the imaging plane at any of the multiple locations within the enclosure; and a detector configured to receive light emitted by the fluorescent markers of the sample upon illumination of the same in the imaging plane when the sample plane is superimposed with the imaging plane.

2. The infrared imaging system of claim 1, wherein the sample plane is vertically offset from the sample-contacting surface.

3. The infrared imaging system of claim 2, wherein the sample plane is vertically offset from the sample-contacting surface by a value corresponding to a thickness of the sample or a fraction thereof.

4. The infrared imaging system of claim 1, wherein the sample plane coincides with the sample-contacting surface.

5. The infrared imaging system of claim 1, wherein the sample-contacting surface is made from a black powder coated steel sheet.

6. The infrared imaging system of claim 1, further comprising one or more anesthesia ports, said one or more anesthesia ports being configured for the injection of an anesthesia gas in the enclosure and for the collection of the anesthesia gas from the enclosure.

7. The infrared imaging system of claim 1, wherein the first and second infrared illumination beams have a wavelength of about 750 nm, about 808 nm or about 980 nm.

8. The infrared imaging system of claim 1, wherein the illumination area has an illumination power density comprised in a range extending from about 1 mW/mm$^2$ to about 3 mW/mm$^2$.

9. The infrared imaging system of claim 1, wherein each one of the first and second illumination module comprises a Köhler integrator.

10. The infrared imaging system of claim 1, wherein the first and second illumination modules are symmetrically disposed on both sides of the detector.

11. The infrared imaging system of claim 1, wherein the first and second illumination modules are calibrated based on calibration data, the calibration data mapping a plurality of orientations of the first and second illumination modules with a corresponding plurality of illumination power densities of the first and second infrared illumination beams and with a corresponding plurality of positions of the sample holder within the enclosure.

12. The infrared imaging system of claim 1, wherein the detector comprises:
a sensor;
a first optical circuit configured to collect and collimate the light emitted by the fluorescent markers; and
a second optical circuit configured to form an image of the sample on the sensor.

13. The infrared imaging system of claim 12, further comprising a motorized focus mechanism connected to the detector, the motorized focus mechanism being configured to vary a distance between the first optical circuit and the second optical circuit.

14. The infrared imaging system of claim 12, further comprising a filter wheel positioned between the first optical circuit and the second optical circuit, the filter wheel comprising a plurality of filters.

15. A method for imaging a sample with fluorescent markers, the method comprising:
providing the sample on a sample holder, the sample holder having a sample-contacting surface and a sample plane;
generating first and second infrared illumination beams towards the sample with first and second illumination modules, the first and second infrared illumination beams interacting at an imaging plane to define an illumination area having a rectangular and homogeneous power profile;
moving the sample holder at multiple locations within the enclosure;
orienting the first and second infrared illumination beams to move the illumination area within the enclosure;
superimposing the sample plane and the imaging plane at any of the multiple locations within the enclosure; and
collecting light emitted by the fluorescent markers of the sample upon illumination of the same by the illumination beam light in the imaging plane when the sample plane is superimposed with the imaging plane.

16. The method of claim 15, further comprising vertically offsetting the sample plane from the sample-contacting surface.

17. The method of claim 15, wherein the sample plane coincides with the sample-contacting surface.

18. The method of claim 15, further comprising conditioning each one of the first and second infrared illumination beams with a Köhler integrator.

19. The method of claim 15, further comprising calibrating the first and second illumination modules based on calibration data, the calibration data mapping a plurality of orientations of the first and second illumination modules with a corresponding plurality of illumination power densities of the first and second infrared beams and with a corresponding plurality of positions of the sample holder within the enclosure.

20. The method of claim 15, further comprising:
collecting and collimating the light emitted by the fluorescent markers with a first optical circuit; and
forming an image of the sample on a sensor with a second optical circuit.

* * * * *